(12) United States Patent
Yoon et al.

(10) Patent No.: US 11,039,097 B2
(45) Date of Patent: Jun. 15, 2021

(54) LENS ARRAY CAMERA AND METHOD OF DRIVING LENS ARRAY CAMERA

(71) Applicant: SAMSUNG ELECTRONICS CO., LTD., Suwon-si (KR)

(72) Inventors: Daekun Yoon, Suwon-si (KR); Yang Ho Cho, Seongnam-si (KR); Kyuhwan Choi, Yongin-si (KR); Deokyoung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/579,977

(22) Filed: Sep. 24, 2019

(65) Prior Publication Data

US 2020/0195873 A1    Jun. 18, 2020

(30) Foreign Application Priority Data

Dec. 12, 2018  (KR) .......................... 10-2018-0159958

(51) Int. Cl.
| | |
|---|---|
| *H04N 5/374* | (2011.01) |
| *H04N 5/225* | (2006.01) |
| *H04N 5/3745* | (2011.01) |
| *G02B 13/00* | (2006.01) |

(52) U.S. Cl.
CPC ......... *H04N 5/3745* (2013.01); *H04N 5/2253* (2013.01); *H04N 5/2254* (2013.01); *H04N 5/2258* (2013.01); *G02B 13/001* (2013.01)

(58) Field of Classification Search
CPC .. H04N 5/3745; H04N 5/2253; H04N 5/2254; H04N 5/2258; G02B 13/001
See application file for complete search history.

(56) References Cited

U.S. PATENT DOCUMENTS

| | | | |
|---|---|---|---|
| 7,866,557 | B2 | 1/2011 | He et al. |
| 9,584,745 | B2 | 2/2017 | Ladd |
| 9,681,057 | B2 | 6/2017 | Attar et al. |
| 2012/0187190 | A1 | 7/2012 | Wang et al. |
| 2014/0063300 | A1 | 3/2014 | Lin et al. |
| 2016/0094834 | A1 | 3/2016 | Ovsiannikov |
| 2017/0111630 | A1 | 4/2017 | Geiss et al. |
| 2017/0366765 | A1 | 12/2017 | Seifi et al. |
| 2018/0152692 | A1* | 5/2018 | Cho .................. H04N 13/106 |

FOREIGN PATENT DOCUMENTS

| | | |
|---|---|---|
| KR | 10-2013-0128226 A | 11/2013 |
| KR | 10-2015-0116030 A | 10/2015 |
| KR | 10-2016-0013891 A | 2/2016 |
| KR | 10-2016-0051849 A | 5/2016 |

* cited by examiner

*Primary Examiner* — Twyler L Haskins
*Assistant Examiner* — Fayez A Bhuiyan
(74) *Attorney, Agent, or Firm* — Sughrue Mion, PLLC

(57) ABSTRACT

A method of driving a lens array camera may include simultaneously driving a first group of sensing elements from among a plurality of sensing elements, each sensing element from among the first group of sensing elements corresponding to a same original signal viewpoint, wherein the plurality of sensing elements is included in a sensor corresponding to the lens array camera including N rows of N lenses, N being a natural number.

15 Claims, 7 Drawing Sheets

LENS ARRAY CAMERA AND METHOD OF DRIVING LENS ARRAY CAMERA

CROSS-REFERENCE TO RELATED APPLICATION

This application is based on and claims priority under 35 U.S.C. § 119 to Korean Patent Application No. 10-2018-0159958, filed on Dec. 12, 2018 in the Korean Intellectual Property Office, the disclosure of which is incorporated by reference herein in its entirety.

BACKGROUND

1. Field

Methods and apparatuses consistent with example embodiments relate to a lens array camera and a method of driving the lens array camera.

2. Description of the Related Art

Due to development of optical technologies and image processing technologies, image capturing apparatuses are being utilized in a wide range of fields, for example, multimedia content, security and recognition. A size of an image capturing apparatus may be determined based on, for example, a size of a lens, a focal length of a lens or a size of a sensor. For example, the size of the image capturing apparatus may be adjusted based on a size of a lens or a size of a sensor. As the size of the sensor decreases, an amount of light incident on the sensor may decrease. Accordingly, a resolution of an image may decrease, or it may be difficult to perform capturing in a low illuminance environment. To reduce the size of the capturing apparatus, a multi-lens including small lenses may be used.

The capturing apparatus using the multi-lens may be mounted on a mobile device, a camera, a vehicle, and a computer due to its small volume and may be used for acquiring an image, recognizing an object, or controlling a device.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

In accordance with an aspect of the disclosure, a method of driving a lens array camera, the method includes simultaneously driving a first group of sensing elements from among a plurality of sensing elements, each sensing element from among the first group of sensing elements corresponding to a same original signal viewpoint, wherein the plurality of sensing elements is included in a sensor corresponding to the lens array camera including N rows of N lenses, N being a natural number.

A number of the plurality of sensing elements and a number of the lenses may be relatively prime.

The number of the plurality of sensing elements may be one more than a predetermined natural multiple of N, N being the number of rows of lenses.

The plurality of sensing elements may be arranged in (N*M+1) rows, M being a predetermined natural number, wherein each row of the plurality of sensing elements includes (N*M+1) sensing elements, wherein when p is equal to N/2 rounded up to the nearest natural number, the first group of sensing elements includes a plurality of rows of sensing elements given by $$\begin{cases} i \times M + r, & 0 \leq i < p \\ i \times M + r + 1, & p \leq i < N \end{cases}$$

wherein r is a natural number corresponding to the first group of sensing elements.

The first group of sensing elements may be one from among a plurality of groups of sensing elements, and the natural number r may be incremented by 1 for each group of sensing elements from among the plurality of groups of sensing elements to be simultaneously driven.

Each lens from among the N rows of N lenses may cover a fraction of at least one sensing element from among the plurality of sensing elements that is less than an entirety of the at least one sensing element.

The fraction of the at least one covered sensing element may be an integer multiple of 1/N.

The method may further include outputting an image corresponding to original signal information received by the plurality of sensing elements by restoring sensing information obtained using the simultaneously driven first group of sensing elements.

In accordance with an aspect of the disclosure, a non-transitory computer-readable storage medium stores instructions that, when executed by a processor, cause the processor to perform a method in accordance with the above-noted aspect of the disclosure.

In accordance with an aspect of the disclosure, a lens array camera includes a processor; and a memory including instructions to be read by a computer, wherein when the instructions are executed in the processor, the processor is configured to simultaneously drive a first group of sensing elements from among a plurality of sensing elements, each sensing element from among the first group of sensing elements being positioned at a same position relative to a respective lens, the plurality of sensing elements corresponding to the lens array camera including N rows of N lenses, N being a natural number.

A number of the plurality of sensing elements and a number of the lenses may be relatively prime.

The number of the plurality of sensing elements may be one more than a predetermined natural multiple of N, N being the number of rows of lenses.

The plurality of sensing elements may be arranged in (N*M+1) rows, M being a predetermined natural number, wherein each row of the plurality of sensing elements includes (N*M+1) sensing elements, wherein when p is equal to N/2 rounded up to the nearest natural number, the first group of sensing elements comprises a plurality of rows of sensing elements given by $$\begin{cases} i \times M + r, & 0 \leq i < p \\ i \times M + r + 1, & p \leq i < N \end{cases}$$

wherein r is a natural number corresponding to the first group of sensing elements.

The first group of sensing elements may be one from among a plurality of groups of sensing elements, and the natural number r may be incremented by 1 for each group of sensing elements from among the plurality of groups of sensing elements to be simultaneously driven.

Each lens from among the N rows of N lenses may cover a fraction of at least one sensing element from among the plurality of sensing elements that is less than an entirety of the at least one sensing element.

The fraction of the at least one covered sensing element may be an integer multiple of 1/N.

The processor may be further configured to output an image corresponding to original signal information received by the plurality of sensing elements by restoring sensing information obtained using the simultaneously driven first group of sensing elements.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
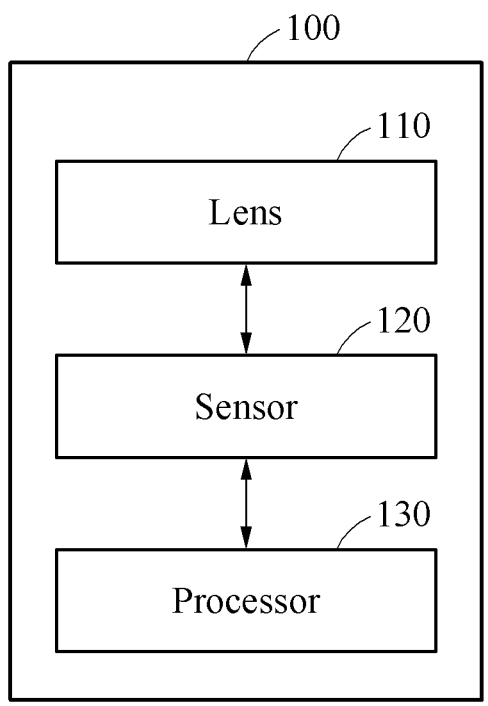
FIG. 1 is a block diagram illustrating a lens array camera according to an example embodiment.

Reference will now be made in detail to example embodiments, examples of which are illustrated in the accompanying drawings, wherein like reference numerals refer to the like elements throughout. Example embodiments are described below in order to explain the present disclosure by referring to the figures.

The following structural or functional descriptions merely describe the example embodiments, and the scope of the example embodiments is not limited to the descriptions provided in the present specification. Various changes and modifications can be made thereto by those of ordinary skill in the art.

Although terms of "first" or "second" are used to explain various components, the components are not limited by the terms. These terms should be used only to distinguish one component from another component. For example, a "first" component may be referred to as a "second" component, or similarly, and the "second" component may be referred to as the "first" component.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in general dictionaries should be construed to have meanings matching contextual meanings in the related art and are not to be construed as an ideal or excessively formal meaning unless otherwise defined herein.

FIG. 1 is a block diagram illustrating a lens array camera according to an example embodiment.

A quality of an image acquired and processed by a lens array camera 100 may be determined based on a number of sensing elements included in a sensor 120 and an amount of light incident on a sensing element. For example, a resolution of the image may be determined based on the number of sensing elements included in the sensor 120 and a sensitivity of the image may be determined based on the amount of light incident on the sensing element. The amount of light incident on the sensing element may be determined based on a size of the sensing element. As the size of the sensing element increases, the amount of light incident on the sensing element may increase, and a dynamic range of the sensor 120 may increase. Thus, as the number of sensing elements included in the sensor 120 increases, the sensor 120 may acquire a higher resolution image. Also, as the size of the sensing element increases, the sensor 120 may improve the quality of high sensitivity imaging in a low light condition.

A size of the lens array camera 100 may be determined based on a focal length f of a lens 110. For example, the size of the lens array camera 100 may be determined based on a gap between the lens 110 and the sensor 120. To collect light refracted by the lens 110, the sensor 120 may be located within the focal length f of the lens 110. Thus, the lens 110 and the sensor 120 included in the lens array camera 100 may be spaced apart by a distance within the focal length f of the lens 110. The focal length f of the lens 110 may be determined based on a viewing angle of the lens array camera 100 and a size of the lens 110, for example, a radius of an aperture of the lens 110. When the viewing angle is fixed, the focal length f may increase proportionally to the size of the lens 110. Also, the size of the lens 110 may be determined based on a size of the sensor 120. For example, to acquire an image in a predetermined viewing angle range, the size of the lens 110 may increase as the size of the sensor 120 increases.

As described above, the size of the lens array camera 100 may be increased to increase the sensitivity of the image while the viewing angle and the resolution of the image are maintained. For example, to increase the sensitivity of the image while maintaining the viewing angle and the resolution of the image, the number of sensing elements included in the sensor 120 may be maintained and the size of each of the sensing elements may be increased, which may increase the size of the sensor 120. In this example, in order to maintain the viewing angle, the size of the lens 110 may be increased according to an increase of the size of the sensor 120 and the focal length f of the lens 110 may be increased, which may increase the size of the lens array camera 100.

To reduce the size of the lens array camera 100, a method of reducing the size of the sensing element and maintaining the resolution of the sensor 120 or a method of reducing the resolution of the sensor 120 and maintaining the size of the sensing element may be used. When reducing the size of the sensing element and maintaining the resolution of the sensor 120, the size of the sensor 120 and the focal length f of the lens 110 may be reduced. In this case, the size of the lens array camera 100 may be reduced but the sensitivity of the image may also be reduced. Thus, a low-illuminance image quality may be degraded. When the resolution of the sensor 120 is reduced and the size of the sensing element is maintained, the size of the sensor 120 and the focal length f of the lens 110 may be reduced. In this case, the size of the lens array camera 100 may be reduced but the resolution of the image may also be reduced.

The following example embodiments may provide technology related to a lens array camera and a method of driving the lens array camera to accurately restore a color image while satisfying a desired viewing angle, resolution, sensitivity, and size of the lens array camera 100. For example, by designing the lens 110 in a small size and maintaining the size of the sensor 120 the focal length f of the lens 110 may be reduced and a thickness of the lens array camera 100 may also be reduced. Referring to FIG. 1, the lens array camera 100 may include the lens 110 and the sensor 120. The lens 110 and the sensor 120 included in the lens array camera 100 of FIG. 1 will be described in detail with reference to FIGS. 2 and 3. A method of driving a sensing element included in the sensor 120 will be described in detail with reference to FIG. 4.

The lens 110 may cover a predetermined area of the sensor 120 corresponding to the size of the lens 110. In other words, light passing through each individual lens 110 may be incident on sensing elements of the sensor 120 included in the predetermined area. The light may include a plurality of light rays. Each of the sensing elements of the sensor 120 may generate sensing information based on incident light rays passing through the lens 110. For example, the sensing element may generate sensing information based on a light ray incident through the lens 110. The lens array camera 100 may acquire an image corresponding to viewpoints included in a field of view of the lens array camera 100 based on the sensing information output by the sensor 120, restore the acquired image, and output a high-resolution image.

In this example, the number of the lenses 110 and the number of sensing elements included in the sensor 120 may be relatively prime. Thus, the lens 110 and the sensing element may be arranged in a fraction structure having a disparity by 1/N, N being the number of lenses. This feature will be described in detail later.

A processor 130 may simultaneously drive sensing elements corresponding to similar original signal information among a plurality of sensing elements arranged in the fraction structure together with the lens 110. The sensing elements corresponding to the similar original signal information will be described in detail with reference to FIG. 4.

Figure 2:
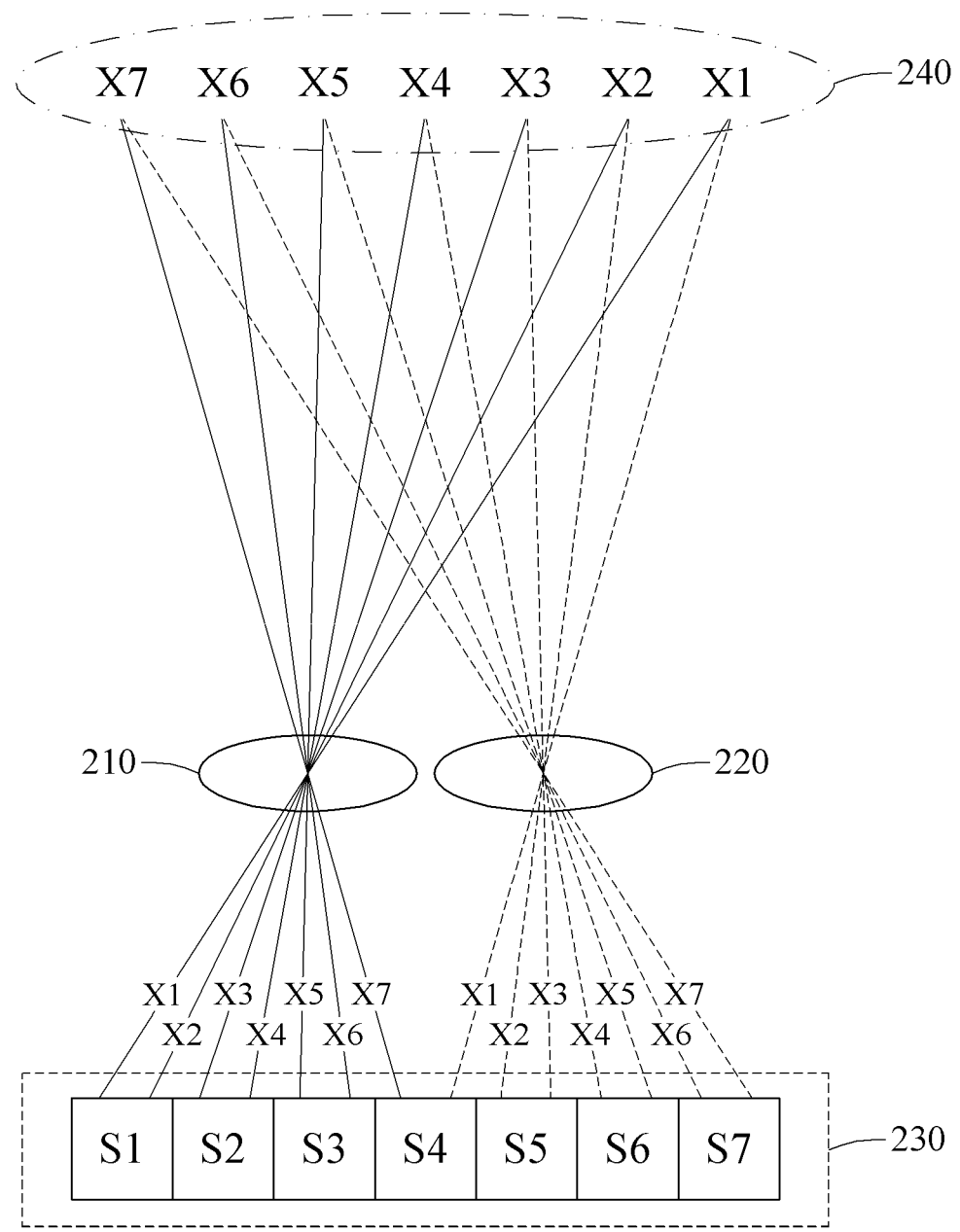
FIG. 2 is a diagram illustrating a relationship between a number of sensing elements and a number of lenses according to an example embodiment.

FIG. 2 is a diagram illustrating a relationship between a number of sensing elements and a number of lenses according to an example embodiment.

A sensor 230 may receive light rays X1 through X7 corresponding to viewpoints 240. For example, as shown in FIG. 2, multiple light rays X1 may correspond to a single viewpoint. The light rays X1 through X7 may be detected by a sensor after passing through lenses 210 and 220. The sensor 230 may include sensing elements S1 through S7 corresponding to a first row among a plurality of rows. The following description will be made based on the sensing elements S1 through S7.

The sensing elements S1 through S7 may sense the light rays X1 through X7 having passed through a plurality of lenses and overlapping one another. For example, the sensing element S1 may generate sensing information by sensing the light rays X1 and X2 passing through a lens 210. In this example, the generated sensing information may be used for outputting a high-resolution image through an application of an image restoration algorithm.

The sensing information generated by the sensing elements S1 through S7 may correspond to original signal information (i.e., incident light ray information from each of the viewpoints 240) as shown in Equation 1 below.

$$S = T \cdot X \quad \text{[Equation 1]}$$

In Equation 1, S denotes a matrix representing sensing information sensed by each of the sensing elements. X denotes a matrix indicating the original signal information. T denotes a transformation matrix that represents a relationship between sensing information detected by the sensing elements S1 through S7 and original signal information corresponding to incident light. The light rays X1 through X7, the lenses, and the sensing elements S1 through S7 of FIG. 2 may be modeled as shown in Equation 2 below.

$$\begin{matrix} S & T & X \end{matrix} \quad \text{[Equation 2]}$$

$$\begin{bmatrix} S1 \\ S2 \\ S3 \\ S4 \\ S5 \\ S6 \\ S7 \end{bmatrix} = \begin{bmatrix} 1 & 1 & 0 & 0 & 0 & 0 & 0 \\ 0 & 0 & 1 & 1 & 0 & 0 & 0 \\ 0 & 0 & 0 & 0 & 1 & 1 & 0 \\ 1 & 0 & 0 & 0 & 0 & 0 & 1 \\ 0 & 1 & 1 & 0 & 0 & 0 & 0 \\ 0 & 0 & 0 & 1 & 1 & 0 & 0 \\ 0 & 0 & 0 & 0 & 0 & 1 & 1 \end{bmatrix} \begin{bmatrix} X1 \\ X2 \\ X3 \\ X4 \\ X5 \\ X6 \\ X7 \end{bmatrix}$$

For example, as set forth in Equation 2, the sensing element S1 may generate sensing information by sensing the light rays X1 and X2 passing through the lens 210. Likewise, the sensing element S2 may generate sensing information by sensing the light rays X3 and X4 passing through the lens 210 and the sensing element S3 may generate sensing information by sensing the light rays X5 and X6 passing through the lens 210. The sensing element S4 may generate sensing information by sensing the light ray X7 passing through the lens 210 and the light ray X1 passing through the lens 220. The sensing element S5 may generate sensing information by sensing the light rays X2 and X3 passing through the lens 220, the sensing element S6 may generate sensing information by sensing the light rays X4 and X5 passing through the lens 220, and the sensing element S7 may generate sensing information by sensing the light rays X6 and X7 passing through the lens 220.

In this example, the light ray X1 may be sensed by both the sensing element S4 and the sensing element S1, the light ray X3 may be sensed by both the sensing element S5 and the sensing element S2, the light ray X5 may be sensed by both the sensing element S6 and the sensing element S3, and the light ray X7 may be sensed by both the sensing element S7 and the sensing element S4.

As such, to restore an original image corresponding to the viewpoint of light rays X1, sensing information obtained by each of the sensing element S1 and the sensing element S4 may be used. Likewise, sensing information obtained by each of the sensing element S2 and the sensing element S5 may be used to restore an original image corresponding to the viewpoint of light rays X3, sensing information obtained by each of the sensing element S3 and the sensing element S6 may be used to restore an original image corresponding to the viewpoint of light rays X5, and sensing information obtained by each of the sensing element S4 and the sensing element S7 may be used to restore an original image corresponding to the viewpoint of light rays X7.

The transformation matrix T between the sensing information generated by the sensing elements S1 through S7 included in the sensor 230 and original signal information corresponding to the light rays X1 through X7 incident from each of the viewpoints 240 may be determined based on the number of lenses and the number of sensing elements.

The fraction structure of the lens 110 and the sensing element will be described. The number of lenses and the number of sensing elements may be relatively prime. For example, the lens array camera may include N*N lenses. Also, the lens array camera may include (N*M+1)(N*M+1) sensing elements. Thus, each lens may cover (M+1/N)(M+1/N) sensing elements. In other words, each lens may further cover M sensing elements in their entirety and a portion of one or more other sensing elements corresponding to a disparity by 1/N. In other words, if the sensing elements are arranged in a grid shape, each lens may cover a fraction of each of the sensing elements positioned along one edge of the lens, and each lens may cover the same fraction of each of the sensing elements positioned along another edge of the lens perpendicular to the first edge. The fraction covered by the lens may be an integer multiple of 1/N.

For example, when a lens array camera includes 5*5 lenses and 26*26 sensing elements, one lens may cover (5+⅕)(5+⅕) sensing elements. That is, the one lens may further cover sensing elements corresponding to a disparity by ⅕.

When the number of lenses and the number of sensing elements are relatively prime, an inverse matrix of the transformation matrix T of Equation 1 may exist. Since the inverse matrix of the transformation matrix T exists, a matrix X indicating original signal information may be calculated by multiplying the inverse matrix of the transformation matrix T by a matrix S indicating sensing information detected by a sensing element as shown in Equation 3 below.

$$X = T^{-1} \cdot S \quad \text{[Equation 3]}$$

Using the matrix X obtained from Equation 3, a high-resolution image corresponding to an original image may be output.

Figure 3:
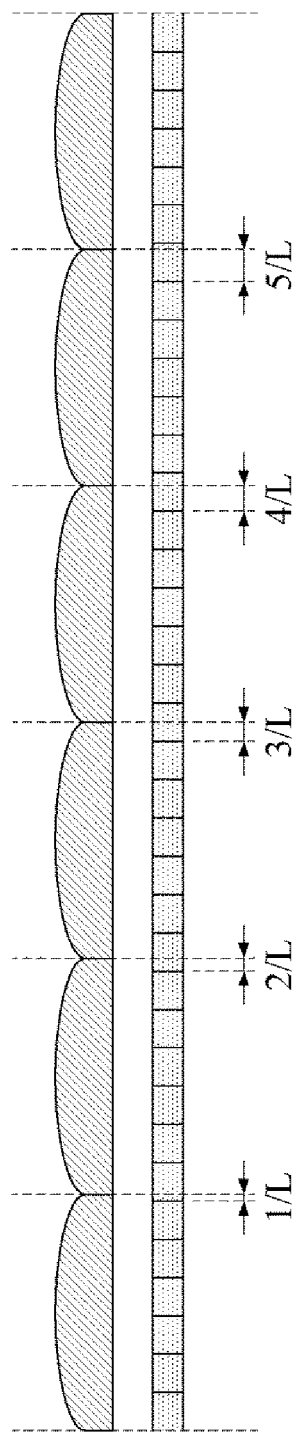
FIG. 3 is a diagram illustrating a relationship between a number of sensing elements and a number of lenses according to an example embodiment.

FIG. 3 is a diagram illustrating a relationship between a number of sensing elements and a number of lenses according to an example embodiment.

A number of lenses and a number of sensing elements which are relatively prime may satisfy Equation 4 below.

Number of sensing elements=Number of lenses(N)
*natural number(M)+1 [Equation 4]

As described with reference to FIG. 3, since a number of lenses N shown in the figure is 6 and a number of sensing elements in one row is 37, a relative prime relationship may be satisfied. In this example, 37/6 sensing elements may be covered per lens.

For example, a first lens may cover the entireties of sensing elements 1 through 6, and may additionally cover ⅙ of sensing element 7. A second lens may cover the remaining ⅚ of sensing element 7, the entireties of sensing elements 8 through 12, and ⅖ of sensing element 13. Likewise, a last lens may cover ⅙ of sensing element 31 and the entireties of sensing elements 32 through 37. As such, each lens may further cover sensing elements corresponding to a disparity by ⅙ (the number of lenses).

When Equation 4 is extended to two dimensions, the number of sensing elements in the entire grid may satisfy Equation 5 below.

Total number of sensing elements=(N*M+1)(N*M+1) [Equation 5]

When the number of sensing elements in one row is 37, a number of sensing elements in a second row may be 37 and, likewise, a number of sensing elements in a 37th row may also be 37. Thus, each lens may cover (6+⅙)*(6+⅙) sensing elements and all lenses, for example, 6*6 lenses may cover 37*37 sensing elements.

According to an example embodiment, it is possible to output a high-resolution image close to an original image by restoring an image acquired by a lens array camera including a lens and a sensing element satisfying Equation 5.

Figure 4:
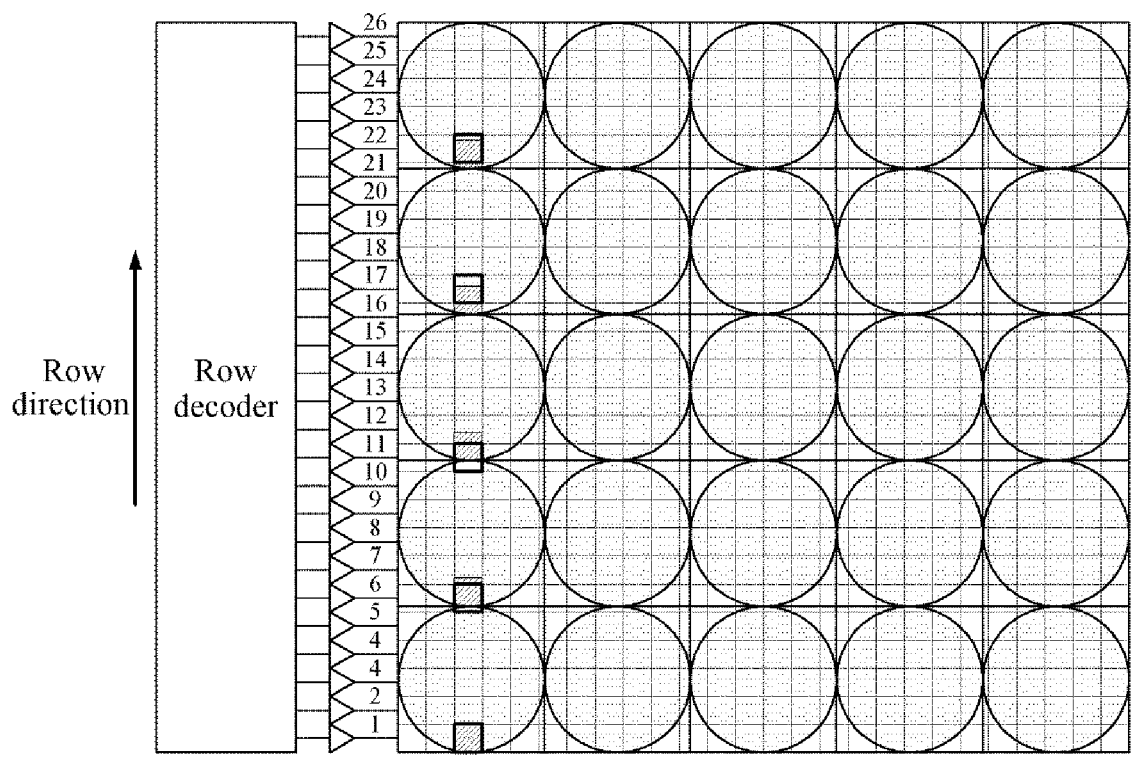
FIG. 4 is a diagram illustrating an arrangement state of a lens and a sensing element according to an example embodiment.

FIG. 4 is a diagram illustrating an arrangement state of a lens and a sensing element according to an example embodiment.

Referring to FIG. 4, a lens array camera includes 5*5 lenses and 26*26 sensing elements. In this example, a number of sensing elements in each row may be (5*5+1) and satisfy Equation 3, and a total number of sensing elements in the grid may be (5*5+1)(5*5+1) and satisfy Equation 4. Thus, one lens may cover (5+⅕)(5+⅕) sensing elements.

A first row through a 26$^{th}$ row may be arranged in a row direction. 26 sensing elements may be arranged in each of the first row through the 26$^{th}$ row. For example, 26 sensing elements may be arranged in the first row, 26 sensing elements may be arranged in a second row, and 26 sensing elements may be arranged in the 26$^{th}$ row.

Sensing elements corresponding to similar original signal information may be simultaneously driven. Here, the sensing elements corresponding to similar original signal information may be sensing elements sensing a light ray corresponding to the similar original signal information. In the example of FIG. 2, the sensing element S1 and the sensing element S4 correspond to the same original light information because they both sense the light rays X1. Also, in the example of FIG. 2, the sensing element S2 and the sensing element S5 correspond to the same original signal information because they both sense the light rays X3.

As an example, in FIG. 4, (the 1$^{st}$ row, a 6$^{th}$ row, an 11$^{th}$ row) may include sensing elements sensing light rays from the same viewpoint and may thus correspond to similar original signal information. The sensing elements of the 1$^{st}$ row may sense a light ray passing through a first lens. The sensing elements of the 6$^{th}$ row may overlap the first lens by ⅕ and overlap a second lens by ⅘. In other words, ⅕ of each sensing element in the 6$^{th}$ row is covered by the first lens and ⅘ of each sensing element in the 6$^{th}$ row is covered by the second lens. Thus, the sensing elements of the 6$^{th}$ row may sense light rays passing through both the first lens and the second lens. Likewise, the sensing elements of the 11$^{th}$ row may overlap the second lens by ⅖ and overlap a third lens by ⅗. In other words, ⅖ of each sensing element in the 11$^{th}$ row is covered by the second lens and ⅗ of each sensing element in the 11$^{th}$ row is covered by the third lens. Thus, the sensing elements of the 11$^{th}$ row may sense light rays passing through both the second lens and the third lens. Although the sensing elements of (the 6$^{th}$ row, the 11$^{th}$ row) overlap other lenses, the sensing elements may sense light rays corresponding to lowermost portions of the second lens and the third lens. Thus, the sensing elements of (the 6$^{th}$ row, the 11$^{th}$ row) may sense light rays from the same viewpoint and may thus correspond to similar original signal information to that of the first row.

In this example, an overlap may occur when the number of lenses and the number of sensing elements satisfy Equation 4 and Equation 5. For example, the lens array camera may include 5*5 lenses and (5*5+1)(5*5+1) sensing elements. In this example, one lens may cover (5+⅕)(5+⅕) sensing elements. Through this, the overlap may occur due to a disparity by ⅕.

The sensing elements of a 16$^{th}$ row may overlap the third lens by ⅗ and overlap a fourth lens by ⅖. Thus, the sensing elements of the 16$^{th}$ row may sense light rays passing through both the third lens and the fourth lens. Likewise, the sensing elements of a 21$^{st}$ row may overlap the fourth lens by ⅘ and overlap a fifth lens by ⅕. Thus, the sensing elements of the 21$^{st}$ row may sense light rays passing through both the fourth lens and the fifth lens. However, instead of corresponding to lowermost portions of the fourth and fifth lenses, the sensing elements of (the 16$^{th}$ row, the 21$^{st}$ row) may sense light rays corresponding to uppermost portions of the third lens and the fourth lens. Thus, the sensing elements of (the 16$^{th}$ row, the 21$^{st}$ row) may not sense light rays from the same viewpoint and thus may not correspond to the original signal information similar to that of (the 1$^{st}$ row, the 6$^{th}$ row, the 11$^{th}$ row). Therefore, the sensing elements of (a 17$^{th}$ row, a 22$^{nd}$ row) subsequent to the sensing elements of (the 16$^{th}$ row, the 21$^{st}$ row) may sense light rays from the same viewpoint and may thus correspond to the original signal information similar to that of (the 1$^{st}$ row, the 6$^{th}$ row, the 11$^{th}$ row).

The lens array camera may drive the sensing elements included in (the 1$^{st}$ row, the 6$^{th}$ row, the 11$^{th}$ row, the 17$^{th}$ row, the 22$^{nd}$ row) instead of (the 1$^{st}$ row, the 6$^{th}$ row, the 11$^{th}$ row, the 16$^{th}$ row, the 21$^{st}$ row) to sense light rays corresponding to a lowermost portion of a lens.

As another example, in FIG. 4, (a 2$^{nd}$ row, a 7$^{th}$ row, a 12$^{th}$ row) may include sensing elements sensing light rays from the same viewpoint and may thus correspond to similar signal original information. Similarly, rather than (the 17$^{th}$ row, the 22$^{nd}$ row), (a 18$^{th}$ row, a 23$^{rd}$ row) may include sensing elements sensing light rays from the same viewpoint and may thus correspond to original signal information similar to that of (the 2$^{nd}$ row, the 7th row, the 12$^{th}$ row).

Generalizing the description above, when a lens array camera includes N*N lenses and (N*M+1)(N*M+1) sensing elements, one lens may cover (M+1/N)(M+1/N) sensing elements. In this example, when p is equal to N/2 rounded up to the nearest natural number, rows corresponding to r, M+r, 2*M+r, (p−1)*M+r, p*M+r+1, ..., (N−1)*M+r+1 may be simultaneously driven. In other words, the rows of sensing elements that may be simultaneously driven are given by:

$$\begin{cases} i \times M + r, & 0 \leq i < p \\ i \times M + r + 1, & p \leq i < N \end{cases} \quad \text{[Equation 6]}$$

The natural number r is incremented by 1 for each set of rows to be simultaneously driven. For example, r=1 for the first set of rows to be simultaneously driven.

The lens array camera may simultaneously drive the sensing elements included in (the 1$^{st}$ row, the 6$^{th}$ row, the 11$^{th}$ row, the 17$^{th}$ row, the 22$^{nd}$ row), and then simultaneously drive the sensing elements included in (the 2$^{nd}$ row, the 7$^{th}$ row, the 12$^{th}$ row, the 18$^{th}$ row, the 23$^{rd}$ row). The lens array camera may simultaneously drive the sensing elements corresponding to similar original signal information for each row instead of sensing on a row-by-row basis.

According to an example embodiment, a lens array camera including a lens and a sensing element satisfying Equation 5 may acquire an image as described above. The image may be restored, so that a high-resolution image close to an original image is output.

Figure 5:
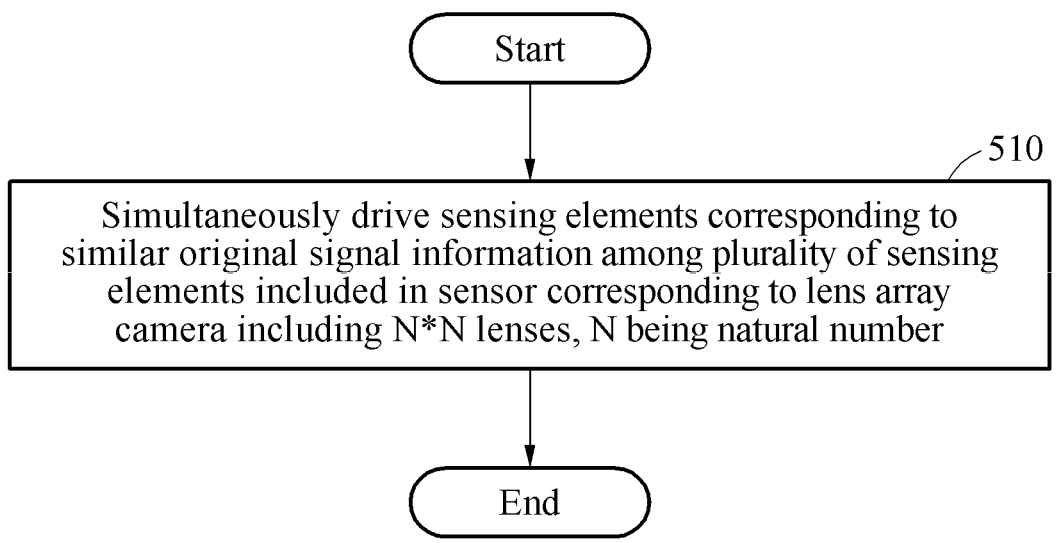
FIG. 5 is a flowchart illustrating a lens array camera driving method performed by a lens array camera according to an example embodiment.

FIG. 5 is a flowchart illustrating a lens array camera driving method performed by a lens array camera according to an example embodiment.

In operation 510, a lens array camera including N*N lenses and a plurality of sensing elements simultaneously drives sensing elements corresponding to similar original signal information among a plurality of sensing elements.

A number of the plurality of sensing elements and a number of the lenses may be relatively prime. For example, the number of the plurality of sensing elements may be a predetermined natural multiple of N+1, N being the number of lenses. Hereinafter, it is assumed that the number of lenses is N*N and p is equal to N/2 rounded up to the nearest natural number.

Here, the sensing elements corresponding to the similar original signal information may include sensing elements at a same position relative to the lens covering the sensing elements among a plurality of sensing elements in a case of a first lens through a p$^{th}$ lens and sensing elements at the same position+1 in a row direction instead of the sensing elements at the same position in a case of a lens after and including a (p+1)$^{th}$ lens.

In other words, the sensing elements may be divided into groups of sensing elements. For each lens, every group may include one sensing element that is covered by the lens. The sensing elements in a given group are each positioned at a same position or at a same position+1 relative to the corresponding lens as set forth above to correspond to a same original signal viewpoint.

When p is equal to N/2 rounded up to the nearest natural number, each group of sensing elements includes a plurality of sensing elements given by Equation 6.

Also, after the sensing elements corresponding to the similar original signal information (i.e., all of the sensing elements in a given group) are simultaneously driven, the sensing elements located at the position+1 in the row direction (i.e., all of the sensing elements in the next group) may be repetitively and simultaneously driven.

For example, the number of sensing elements is 26*26, the number of lenses is 5*5, and a natural number rounded by 5/2, p is 3, sensing elements at a same position among a plurality of sensing elements corresponding to each lens in a case of a first lens through a third lens and sensing elements at the same position+1 in a case of a fourth lens and a fifth lens may be simultaneously driven. Related description is made with reference to FIG. 4.

As such, among the sensing elements corresponding to the first lens through the fifth lens, the sensing elements at the same position may not be simultaneously driven and thus, a difference occurs therebetween. This is because the lens more covers the sensing elements by M+1/N due to a disparity by 1/N occurring when the sensing element and the lens are arranged in a fraction structure described above and as shown, e.g., in FIG. 4.

According to an example embodiment, an image acquired using a lens array camera including a lens and a sensing element satisfying the fraction structure may be restored so as to be output as a high-resolution image with a high degree of similarity to an original image.

Figure 6:
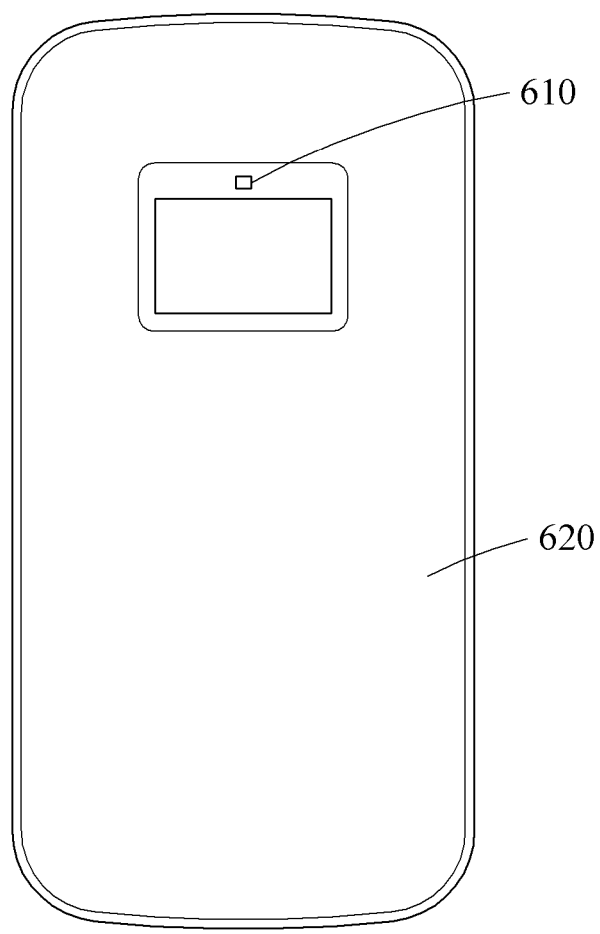
FIGS. 6 and 7 are diagrams illustrating a device in which a lens array camera is implemented according to an example embodiment.
Figure 7:
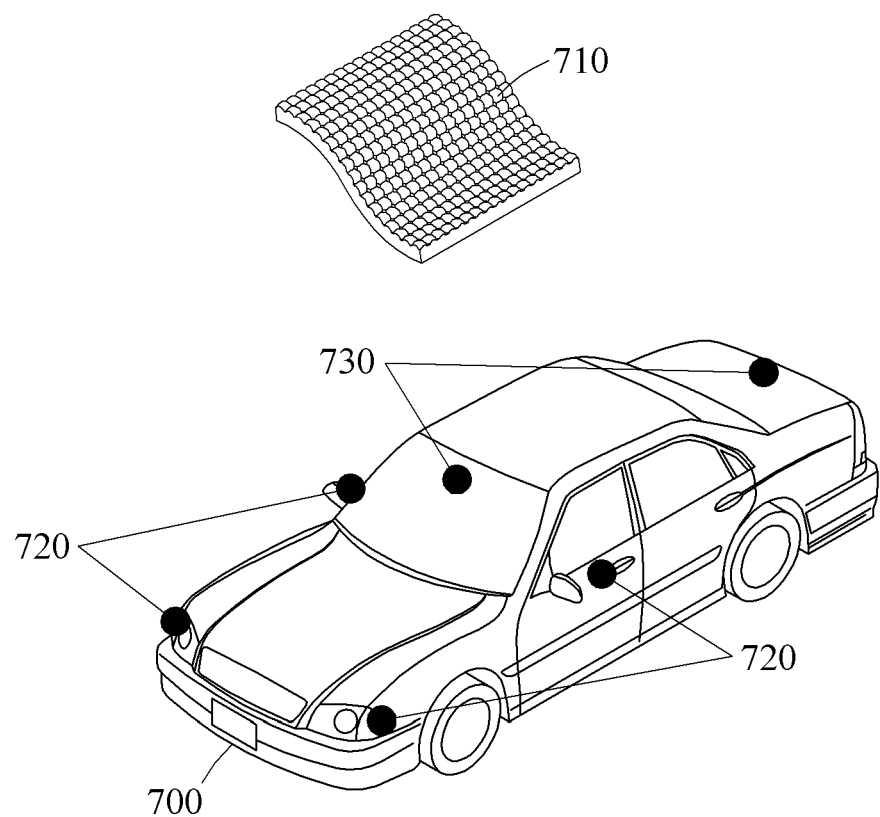

FIGS. 6 and 7 are diagrams illustrating a device in which a lens array camera is implemented according to an example embodiment.

An image acquired using a lens array camera may be applied to various fields of outputting a high-resolution image. The lens array camera may include a plurality of sensing elements spaced apart in a relatively small focal length through a plurality of lenses. The lens array camera may have a small thickness.

Due to a use of the plurality of lenses, a size of the lens array camera may be reduced. Thus, the lens array camera may be applied not only to a user terminal but also to a wearable device, such as a smart watch, a smart band, smart glasses, and the like, of which a size is relatively important.

For example, as illustrated in FIG. 6, a lens array camera 610 may be implemented in a user terminal 600 as a front or rear camera. A sensor of the lens array camera 610 may be implemented as a full-frame sensor. A lens of the lens array camera 610 may be implemented as a micro lens.

Referring to FIG. 7, a vehicle 700 may include lens array cameras at points, for example, points 720 and 730. A lens array camera may be adjustable in size and thus, may be installed in the vehicle without hindering a design or stability.

For example, a lens array camera may be implemented as a front camera or a rear camera of the vehicle 700. In this example, the lens array camera may use a curved lens array 710. That is, the curved lens array in which a connecting portion between lenses is designed to be bent may be used in the lens array camera.

However, the present examples are not to be taken as being limited thereto. The lens array camera may be applicable to, for example, a digital single-lens reflex (DSLR) camera, a drone, a closed-circuit television (CCTV), a webcam camera, a panoramic camera, a movie or broadcast video camera, and a virtual reality/augmented reality (VR/AR) camera. Furthermore, the lens array camera may be applicable to various fields, for example, a flexible/stretchable camera, a compound-eye camera, and a contact lens type camera.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of driving a lens array camera, the method comprising:
   simultaneously driving a first group of sensing elements from among a plurality of sensing elements, each sensing element from among the first group of sensing elements corresponding to a same original signal viewpoint,
   wherein the plurality of sensing elements is included in a sensor corresponding to the lens array camera including N rows of N lenses, N being a natural number,
   wherein the plurality of sensing elements are arranged in (N*M+1) rows, M being a predetermined natural number,
   wherein each row of the plurality of sensing elements includes (N*M+1) sensing elements,
   wherein when p is equal to N/2 rounded up to the nearest natural number, the first group of sensing elements includes a plurality of rows of sensing elements given by $$\begin{cases} i \times M + r, & 0 \le i < p \\ i \times M + r + 1, & p \le i < N \end{cases}$$

wherein r is a natural number corresponding to the first group of sensing elements.

2. The method of claim 1, wherein a number of the plurality of sensing elements and a number of the lenses are relatively prime.

3. The method of claim 2, wherein the number of the plurality of sensing elements is one more than a predetermined natural multiple of N, N being the number of rows of lenses.

4. The method of claim 1, wherein the first group of sensing elements is one from among a plurality of groups of sensing elements, and
   wherein the natural number r is incremented by 1 for each group of sensing elements from among the plurality of groups of sensing elements to be simultaneously driven.

5. The method of claim 1, wherein each lens from among the N rows of N lenses covers a fraction of at least one sensing element from among the plurality of sensing elements that is less than an entirety of the at least one sensing element.

6. The method of claim 5, wherein the fraction of the at least one covered sensing element is an integer multiple of 1/N.

7. The method of claim 1, further comprising:
   outputting an image corresponding to original signal information received by the plurality of sensing elements by restoring sensing information obtained using the simultaneously driven first group of sensing elements.

8. A non-transitory computer-readable storage medium storing instructions that, when executed by a processor, cause the processor to perform the method of claim 1.

9. A lens array camera comprising:
   a processor; and
   a memory including instructions to be read by a computer,
   wherein when the instructions are executed in the processor, the processor is configured to simultaneously drive a first group of sensing elements from among a plurality of sensing elements, each sensing element from among the first group of sensing elements corresponding to a same original signal viewpoint, the plurality of sensing elements corresponding to the lens array camera including N rows of N lenses, N being a natural number,
   wherein the plurality of sensing elements are arranged in (N*M+1) rows, M being a predetermined natural number,
   wherein each row of the plurality of sensing elements includes (N*M+1) sensing elements,
   wherein when p is equal to N/2 rounded up to the nearest natural number, the first group of sensing elements comprises a plurality of rows of sensing elements given by $$\begin{cases} i \times M + r, & 0 \le i < p \\ i \times M + r + 1, & p \le i < N \end{cases}$$

wherein r is a natural number corresponding to the first group of sensing elements.

10. The lens array camera of claim 9, wherein a number of the plurality of sensing elements and a number of the lenses are relatively prime.

11. The lens array camera of claim 10, wherein the number of the plurality of sensing elements is one more than a predetermined natural multiple of N, N being the number of rows of lenses.

12. The lens array camera of claim 9, wherein the first group of sensing elements is one from among a plurality of groups of sensing elements, and wherein the natural number r is incremented by 1 for each group of sensing elements from among the plurality of groups of sensing elements to be simultaneously driven.

13. The lens array camera of claim 9, wherein each lens from among the N rows of N lenses covers a fraction of at least one sensing element from among the plurality of sensing elements that is less than an entirety of the at least one sensing element.

14. The lens array camera of claim 13, wherein the fraction of the at least one covered sensing element is an integer multiple of 1/N.

15. The lens array camera of claim 9, wherein the processor is further configured to output an image corresponding to original signal information received by the plurality of sensing elements by restoring sensing information obtained using the simultaneously driven first group of sensing elements.

* * * * *